United States Patent
Boehnel

(10) Patent No.: US 9,414,467 B2
(45) Date of Patent: Aug. 9, 2016

(54) METHOD FOR ADDRESSING LIGHT FIXTURES, LIGHT FIXTURE FOR LIGHTING AND SYSTEM FOR LIGHTING A ROOM

(71) Applicant: ZUMTOBEL LIGHTING GMBH, Dornbirn (AT)

(72) Inventor: Michael Boehnel, Dornbirn (AT)

(73) Assignee: ZUMTOBEL LIGHTING GMBH, Dornbirn (AT)

( * ) Notice: Subject to any disclaimer, the term of this patent is extended or adjusted under 35 U.S.C. 154(b) by 0 days.

(21) Appl. No.: 14/654,378

(22) PCT Filed: Dec. 19, 2013

(86) PCT No.: PCT/EP2013/077399
§ 371 (c)(1),
(2) Date: Jun. 19, 2015

(87) PCT Pub. No.: WO2014/096198
PCT Pub. Date: Jun. 26, 2014

(65) Prior Publication Data
US 2015/0351200 A1   Dec. 3, 2015

(30) Foreign Application Priority Data

Dec. 20, 2012  (DE) .......................... 10 2012 223 966

(51) Int. Cl.
*H05B 37/02* (2006.01)
(52) U.S. Cl.
CPC .................................. *H05B 37/0245* (2013.01)
(58) Field of Classification Search
CPC .......................... H05B 37/0227; H05B 33/0854
USPC .......................................... 315/152–154, 294
See application file for complete search history.

(56) References Cited

U.S. PATENT DOCUMENTS

| | | | |
|---|---|---|---|
| 8,918,118 B2 | 12/2014 | Zudrell-Koch | |
| 2011/0141727 A1 | 6/2011 | Kim | |
| 2012/0038281 A1* | 2/2012 | Verfuerth | H05B 37/0272 315/152 |
| 2012/0105204 A1 | 5/2012 | Van Beeck | |
| 2013/0249409 A1* | 9/2013 | VanWagoner | H05B 37/0245 315/154 |
| 2014/0001964 A1* | 1/2014 | Ono | H05B 37/0227 315/153 |
| 2014/0117852 A1* | 5/2014 | Zhai | H05B 37/0245 315/86 |
| 2014/0285093 A1* | 9/2014 | Morimoto | H05B 33/0854 315/152 |
| 2015/0174361 A1* | 6/2015 | Baaijens | A61N 5/0618 315/131 |

FOREIGN PATENT DOCUMENTS

| | | |
|---|---|---|
| DE | 102009050733 | 4/2011 |
| DE | 102010038792 | 2/2012 |
| EP | 2315503 | 4/2011 |

(Continued)

OTHER PUBLICATIONS

International Search Report for PCT/EP2013/077399, English translation attahed to original, Both completed by the European Patent Office on Apr. 23, 2014, 7 Pages.

*Primary Examiner* — Don Le
(74) *Attorney, Agent, or Firm* — Brooks Kushman P.C.

(57) ABSTRACT

A method for addressing light fixtures, in a system for lighting, and a plurality of light fixtures arranged within a region for lighting. The area around every light fixture is detected by a camera which is associated with the corresponding light fixture. The position of every light fixture within the region is determined with the aid of the data acquired by the cameras.

15 Claims, 1 Drawing Sheet

(56) References Cited

FOREIGN PATENT DOCUMENTS

| EP | 2434842 | 3/2012 |
|---|---|---|
| GB | 2418482 | 3/2006 |
| WO | 2009010926 | 1/2009 |
| WO | 2012093110 | 7/2012 |

* cited by examiner

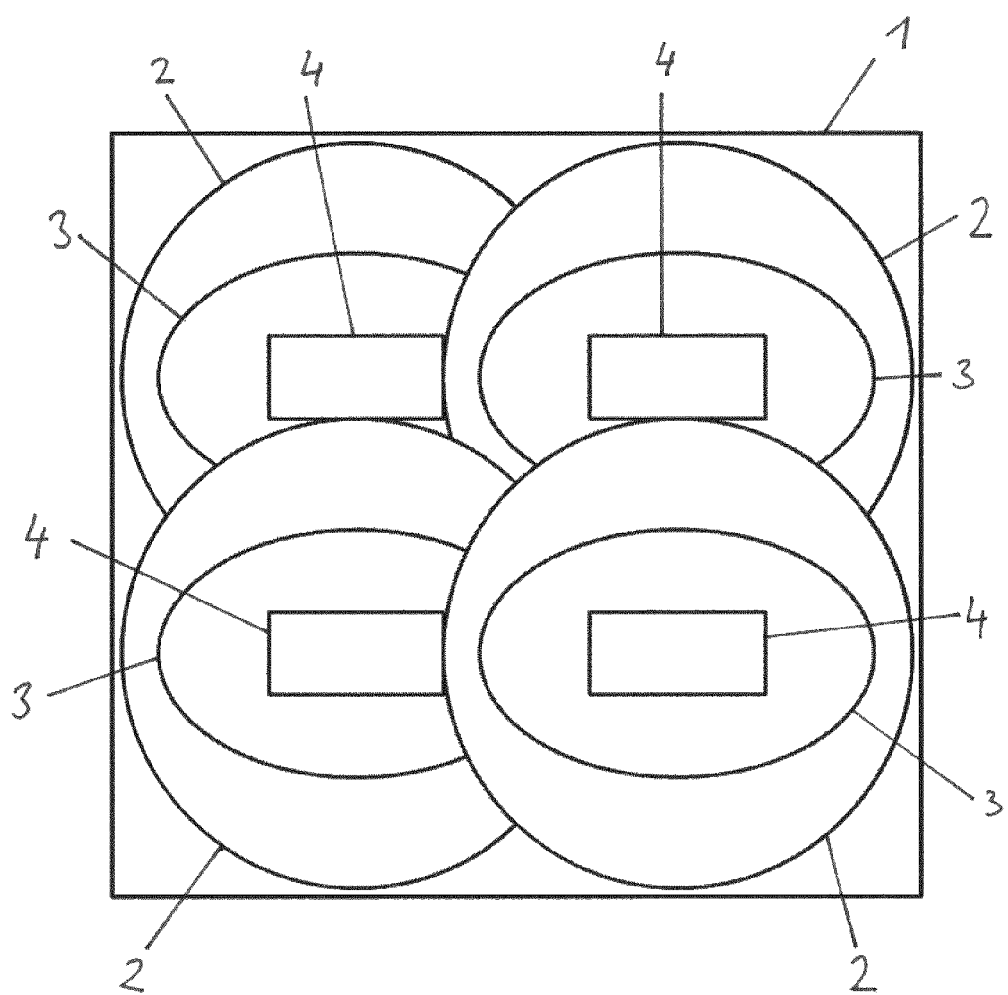

METHOD FOR ADDRESSING LIGHT FIXTURES, LIGHT FIXTURE FOR LIGHTING AND SYSTEM FOR LIGHTING A ROOM

CROSS-REFERENCE TO RELATED APPLICATION

This application is the U.S. national phase of PCT Application No. PCT/EP2013/077399 filed on Dec. 19, 2013, which claims priority to DE Patent Application No. 10 2012 223 966.9 filed on Dec. 20, 2012, the disclosures of which are incorporated in their entirety by reference herein.

The present invention relates to a method for addressing luminaires, wherein the luminaires are arranged within an area, for example a room, to a luminaire for lighting and to a system for lighting an area, which has a plurality of luminaires arranged within the room.

In relatively large rooms of buildings, for example large-area offices, a large number of luminaires is usually arranged within a room to ensure sufficient lighting of the room. In most application cases, provision is made in this case for the luminaires to be actuated not only via a simple on/off switch but for said luminaires to be able to be controlled by a control center as well, for example. In order to be able to distinguish between the individual luminaires, it is therefore necessary to allocate a corresponding operating address to each luminaire.

In order to enable sensible control of the luminaires by means of a control center, for example, it is then also necessary, however, for the position of the individual luminaires within a room to be known and, where possible, for the operating addresses to be assigned to the luminaires corresponding to the position.

In order to enable such position-related assignment of the operating addresses, various solutions are already known. Thus, for example, in one variant provision is made for the luminaires to each individually output a corresponding light signal and to thereby identify themselves and then for the position of the luminaire within the room to be established by a fitter or installer. Then, the fitter or installer can either assign an operating address to the respective luminaire himself or communicate the position within the room to a control center, with the control center then performing the allocation of an operating address.

Another previously known variant provides for the sensing of the position to take place via a so-called inhouse GPS.

In a third variant, all of the luminaires are sensed with the aid of an external camera and then the position of each luminaire is determined by evaluation of the image. In this case, provision is specifically made for a fitter or installer, after fitting of the luminaires to a ceiling of a room, to walk into the center of the room and to use a corresponding camera to take an image of the ceiling from below, on which image the respective position of the luminaires can then be seen, for example. In this case, provision can additionally in turn then be made for the luminaires to be switched on and off individually and, in the process, for an image of the entire ceiling from below to be produced for each switched-on luminaire, as a result of which it is then possible to identify which luminaire has illuminated at which position in which image.

In all variants, however, it is necessary to consider that at least sometimes intervention of a fitter or installer is required.

The present invention is correspondingly based on the object of indicating an alternative to the previously known addressing methods which enables convenient and automatic allocation of an operating address for a large number of luminaires within a room, for example a large-area office.

The object is achieved by a method for addressing luminaires as claimed in claim 1, a luminaire for lighting as claimed in claim 11 and a system for lighting an area as claimed in claim 15. Advantageous developments of the invention are the subject matter of the dependent claims.

In accordance with the invention, a method for addressing luminaires which are arranged within an area, in particular within a common room, is proposed, in which the region around each luminaire is sensed in each case by a camera, which is assigned to the corresponding luminaire, and the position of each luminaire within the area is determined from the data acquired by the cameras.

Furthermore, a luminaire for lighting is proposed to which a camera is assigned, which camera is designed to sense the area around the luminaire.

In addition, a system for lighting an area is also proposed, which system has a plurality of luminaires according to the invention arranged within the area and is designed to perform the addressing of the individual luminaires in accordance with the method according to the invention.

In contrast to the already known method in which an external camera is arranged in the center of the room, for example, and then an image of all of the luminaires arranged on a ceiling is taken from below, provision is now made for a camera to be assigned to each luminaire, said camera sensing the region surrounding the luminaire and then the position of each luminaire being determined on the basis of the acquired data of all of the cameras.

Advantageously, in this case provision can then be made for an address to be allocated to each luminaire on the basis of the determined position of each luminaire within the area.

The data acquired by the cameras are then preferably transmitted to a control center, which determines the position of each luminaire within an area and then allocates an address to each luminaire.

The cameras in particular each sense the region beneath the corresponding luminaire. In this case, provision can be made for the cameras to each sense a comparably large region and to each have a comparable viewing direction.

Provision is advantageously made for the data acquired by the cameras to be combined to form an overall view or an overall image of the area or room and for the position of each luminaire within the area to be determined with the aid of the data acquired by the respectively associated camera in conjunction with the overall view of the area. In addition, in this case provision can also be made for the luminaires to be switched on and off, in particular individually, and for the direction from which the light is being emitted to be determined in each case from the acquired data of the cameras, wherein, in order to determine the position of each luminaire within the room, in addition the determined directional information is also then used.

As an alternative to the use of an overall view or an overall image, provision can also be made for the luminaires to be switched on and off, in particular individually, and for the direction from which the light is being emitted to be determined in each case from the acquired data of the cameras, wherein, with the aid of the directional information, the position of each luminaire within the area is determined.

For the case where directional information is used for determining the position, provision can furthermore be made for the acquired data of a camera of a luminaire to be used to determine the direction from which the light of the other luminaires, in particular the adjacent luminaires, is being emitted and in this case in particular to determine whether the light is being emitted from the left, from the right, from the front or from the rear. In this case, it would also be possible for the viewing field or the sensing range of the respective camera to be changed or restricted during the determination to ascertain the direction from which the light is being emitted.

Preferably, provision can in addition also be made for the camera to have a wide-angle optical element or a so-called fisheye and to be arranged in or directly on the luminaire.

The invention will be explained in more detail below with reference to exemplary embodiments and the attached drawing, in which:

FIG. 1 shows a schematic illustration of a room comprising a plurality of luminaires.

As an exemplary application for the present invention, an arrangement of luminaires within a room is described below, wherein addresses are intended to be assigned to these luminaires. The concept in accordance with the invention, however, would equally also be applicable in outdoor lighting, for example in streetlighting or for car park lighting. For such an outdoor application, directed or further image acquisition by the cameras would possibly be expedient.

FIG. 1 illustrates schematically a room 1 in which four luminaires 4 for lighting the room 1 are fitted to the ceiling, for example. The luminaires 4 are in this case, as is shown in FIG. 1, distributed uniformly in the room 1. In addition, in each case the light field 3, i.e. the region which is illuminated by the luminaire 4, is also shown for each luminaire 4.

In accordance with the invention, provision is now made for a camera to be assigned to each luminaire 4, which camera in each case senses the region beneath the corresponding luminaire 4, wherein this region is in each case illustrated as camera field 2 in FIG. 1. The acquired data therefore constitute an image of the region beneath the corresponding luminaire 4 in each case. As can be seen from FIG. 1, provision is made here for substantially the entire room 1 beneath the luminaires 4 to be sensed by the camera fields 2 of the cameras of all of the four luminaires 4. In addition, it should also be noted that, in FIG. 1, the camera fields 2 sensed by the cameras cover a larger region than the light fields 3. However, it would also be possible for the camera fields 2 and the light fields 3 to be of equal size and to cover the same region, or even for the camera fields 2 to be smaller than the light fields 3.

The cameras assigned to the luminaires 4 are in this case each arranged in or directly on the luminaires 4 and preferably have a wide-angle lens or a fisheye lens. In addition, provision is also made, as can be seen from FIG. 1 as well, for the cameras of the luminaires 4 to each sense a comparable region and also to each have a comparable viewing direction. This results, for example, from the use of identical cameras and optical elements in all of the luminaires 4 and in each case the same positioning of the cameras on the luminaires 4.

Furthermore, provision is then made for the acquired data or images of the individual cameras to be transmitted to a control center and for this control center then to determine the position of each luminaire 4 within the room 1 from the data or images acquired by the cameras. On the basis of the determined position, the control center can then allocate an address to each luminaire 4.

The determination of the position of each luminaire 4 within the room 1 can in this case take place by virtue of the fact that an overall view or an overall image of the room 1 is created or combined from the acquired data or individual images of the cameras. This overall view then reproduces a view of the room 1 from the point of view of the luminaires 4. In order to generate such an overall view from individual images, various techniques have already long been known, for which reason more precise details in this regard are not provided here. Purely by way of example, reference is made to the so-called photostitchers for generating panoramic images.

With the aid of the overall view in conjunction with the individual images of the respective cameras, it is then possible for the position of each luminaire 4 within the room 1 to be determined. This is possible by virtue of the fact that it is known which luminaire 4, or the corresponding camera, has contributed which subregion to the overall view, as a result of which the position of the luminaire 4 can then be determined correspondingly.

On the basis of the position information of each luminaire 4, it is then possible to allocate in each case corresponding operating addresses to the luminaires 4.

As an alternative to the generation of an overall view, the determination of the position of each luminaire 4 can also take place by virtue of the fact that the luminaires 4 are switched on and off and the direction from which the light is being emitted or the direction in which the light emission is taking place in each case is determined from the acquired data or images of the cameras, wherein the position of each luminaire 4 within the room 1 is then determined with the aid of the directional information. By virtue of the arrangement of the cameras on or in the luminaires 4, in particular the light from the other luminaires 4, preferably the adjacent luminaires 4, is therefore then captured by the cameras, as a result of which it is possible to determine the direction from which the light is being emitted in each case. As a result, it is then possible, for example, for an indication to be given of whether the light is being emitted from the left, from the right, from the front or from the rear. With the aid of this information, a relative arrangement of the luminaires 4 in the room 1 is thus produced, which allows allocation of the operating addresses.

Thus, the luminaires 4 are switched on and off, for example individually, by a control center in order to determine the directional information, as a result of which the control center then knows when a luminaire 4 was switched on and off and therefore the assignment to the acquired data or images of the cameras is possible.

In FIG. 1, it will be possible, for example, for the luminaire 4 illustrated at the top left in FIG. 1 to be switched on and for all of the other luminaires 4 to be switched off. It is then possible to determine from the images of the cameras of the other luminaires 4 the direction from which the light is being emitted. Thus, it can be seen from the image of the camera of the luminaire 4 which is arranged at the top right that the light is being emitted from the left. In contrast, it can be seen from the image of the camera of the luminaire 4 arranged at the bottom left in FIG. 1 that the light is being emitted from the front. The same then also applies to the image of the camera of the luminaire 4 which is arranged at the bottom right.

Once the luminaire 4 which is arranged at the top left has been switched off again, the same procedure can be performed correspondingly to the other luminaires 4. From all of this information, the positions of the individual luminaires 4 can then be determined. As an alternative to switching each individual luminaire 4 on and off, the use of a special algorithm can also be provided, in which, where possible, a plurality of luminaires 4 can then also be switched on and off simultaneously.

In addition, it is then also still possible for the viewing field or the viewing angle of the camera to be changed or restricted, as a result of which the cameras in each case now only directly sense light from the adjoining luminaires 4. In addition, by varying the sensing range or the viewing field of a camera, it is also possible to establish with even more precision the direction in which, starting from a specific luminaire 4, that luminaire 4 which is emitting light at that time is located.

When the luminaires 4 are switched on and off, in addition provision can also be made for this to take place randomly or else for said luminaires to be switched on and off in a targeted manner by the control center.

The above-described determination of the position of each luminaire 4 with the aid of the overall view of the room can furthermore also be combined with the determination of the position of each luminaire 4 with the aid of the directional information by luminaires 4 being switched on and off, in which case the position of each luminaire 4 is determined both from the images in conjunction with the overall view and from the determined directional information.

This is particularly suitable, for example, when the luminaires are arranged in rooms which are not substantially different or have a regular arrangement of workstations or the like.

Furthermore, in addition it may also be expedient to use plan data, such as windows, furniture, structure/color information of walls/surfaces/floors of the room as well and to correlate these with the individual images of the cameras or the overall view of the room and therefore to obtain additional information on the positioning of each luminaire.

In connection with FIG. 1, the use of a control center is explained. However, it would likewise be conceivable for the cameras not to be connected to a control center, but to be connected directly to one another and to perform the evaluation independently. Alternatively, there is also the possibility of the address allocation not taking place fully automatically, but of a fitter or installer then allocating operating addresses to the individual luminaires with the aid of the overall view.

It is essential that a camera is assigned to each luminaire, said camera sensing or recording the region around the luminaire or beneath the luminaire.

The invention claimed is:

1. A method for addressing luminaires, comprising;
    arranging luminaires within an area,
    sensing a region around each luminaire using a camera, which is assigned to the corresponding luminaire,
    determining the position of each luminaire within the area from data acquired by the cameras, and
    allocating an address to each luminaire based on the determined position of each luminaire within the area.

2. The method as claimed in claim 1, wherein the data acquired by the cameras are transmitted to a control center, and the control center determines the position of each luminaire within the area and allocates an address to each luminaire.

3. The method as claimed in claim 1, wherein the cameras each sense the region beneath the corresponding luminaire.

4. The method as claimed in claim 1, wherein the cameras each sense a comparably large region and each have a comparable viewing direction.

5. The method as claimed in claim 1, wherein the data acquired by the cameras are combined to form an overall view or an overall image of the area, and the position of each luminaire within the area is determined with the aid of the data acquired by the respectively associated camera in conjunction with the overall view of the area.

6. The method as claimed in claim 5, wherein the luminaires are individually switched on and off, and the direction from which the light is being emitted is determined in each case from the acquired data of the cameras, wherein, in order to determine the position of each luminaire within the area, in addition the determined directional information is also then used.

7. The method as claimed in claim 1, wherein the luminaires are individually switched on and off, and the direction from which the light is emitted is determined in each case from the acquired data of the cameras, wherein, with the aid of the directional information, the position of each luminaire within the area is determined.

8. The method as claimed in claim 6, wherein the acquired data of a camera of one luminaire are used to determine the direction from which the light of the other adjacent luminaires, is being emitted and in this case in particular it is determined whether the light is being emitted from the left, from the right, from the front or from the rear.

9. The method as claimed in claim 6, wherein the sensing range of the respective camera is changed or restricted during the determination to ascertain the direction from which the light is being emitted.

10. A system for lighting an area, the system comprising:
    a plurality of luminaires for lighting arranged within the area;
    a plurality of cameras each assigned to a luminaire, said cameras being configured to sense the region around each of the luminaires; and
    a controller connected to the plurality of luminaires and programed to:
        determine the relative positions of each luminaire from data from the plurality of luminaire cameras, and
        on the basis of the determined position of each luminaire within the area, allocate an address to each luminaire.

11. The system as claimed in claim 10, wherein the cameras each sense a region beneath the corresponding luminaire.

12. The system as claimed in claim 10, wherein the cameras have a wide-angle optical element or a fisheye lens.

13. The system as claimed in claim 10, wherein the cameras are each arranged in or directly on the corresponding luminaire.

14. The system as claimed in claim 10, wherein the controller is a control center separate from the plurality of luminaires and the control center is connected to each of the luminaires.

15. The system as claimed in claim 10, wherein the controller is arranged in one of the plurality of luminaires and the controller is connected to each of the other luminaires.

* * * * *